United States Patent [19]
Coman et al.

[11] Patent Number: 5,556,129
[45] Date of Patent: Sep. 17, 1996

[54] VEHICLE SEAT BACK WITH A HEAD SIDE IMPACT AIR BAG

[75] Inventors: Sorin Coman, Madison Hts; Frank Wu, Novi; Robert L. Demick, Eastpointe, all of Mich.

[73] Assignee: Hoover Universal, Plymouth, Mich.

[21] Appl. No.: 441,813

[22] Filed: May 16, 1995

[51] Int. Cl.$^6$ ................................................ B60R 21/22
[52] U.S. Cl. ...................... 280/730.2; 297/216.12
[58] Field of Search ............................ 280/728.1, 730.1, 280/730.2; 297/483, 216.12, 216.1

[56] References Cited

U.S. PATENT DOCUMENTS

| | | |
|---|---|---|
| 4,946,191 | 8/1990 | Putsch . |
| 4,989,896 | 2/1991 | DiSalvo et al. ........................ 280/728.3 |
| 5,112,079 | 5/1992 | Haland et al. . |
| 5,251,931 | 10/1993 | Semchena et al. . |
| 5,322,322 | 6/1994 | Bark et al. . |
| 5,348,342 | 9/1994 | Haland et al. . |
| 5,362,132 | 11/1994 | Griswold et al. . |
| 5,390,950 | 2/1995 | Barnes et al. ......................... 280/728.2 |
| 5,458,396 | 10/1995 | Rost .................................... 297/216.12 |

FOREIGN PATENT DOCUMENTS

| | | | |
|---|---|---|---|
| 4218252 | 12/1992 | Germany | ................................ 280/730 |
| 4231050 | 3/1994 | Germany | ................................ 280/807 |
| 4-166452 | 6/1992 | Japan | ................................ 280/730.2 |

*Primary Examiner*—Karin Tyson
*Attorney, Agent, or Firm*—Harness, Dickey & Pierce, P.L.C.

[57] ABSTRACT

A seat back for a motor vehicle having a tower extending upwardly from the seat back upper end along one lateral side of the seat back. The tower contains an inflatable air bag which is deployable to provide head side impact protection for a seat occupant. By mounting the air bag within a raised tower, the air bag is deployed from a higher location in the seat back to reduce the possibility of interference between the air bag and a shoulder belt. Furthermore, by not mounting the air bag to the seat back head restraint, it is possible to provide a fully adjustable head restraint attached to the seat back and extending upwardly from the seat back upper end. A removable side bolster is also provided which covers the air bag canisters mounted to the seat back frame. Following deployment of an air bag, the bolster and air bag canister are removed and replaced with new components. This enables the seat assembly to be repaired without replacement of the entire seat assembly or seat back.

6 Claims, 9 Drawing Sheets

VEHICLE SEAT BACK WITH A HEAD SIDE IMPACT AIR BAG

BACKGROUND AND SUMMARY OF THE INVENTION

The present invention relates generally to a vehicle seat assembly containing a head side impact air bag and in particular to a seat assembly in which a side impact air bag is provided in a structure raised above the seat back along one side to provide side impact protection for the head of a seat occupant.

Vehicle manufacturers are constantly seeking to improve the occupant protection during a vehicle collision. Increasing attention is being directed toward improving the occupant protection during a side impact vehicle collision. One of many ways of doing so is to provide an inflatable air bag which deploys between an occupant and a vehicle side door. Such an inflatable air bag can be mounted either to the vehicle door or to a vehicle seat along the outboard side of the seat so as to deploy into the space between the occupant and the door.

One example of a seat mounted inflatable air bag is shown in U.S. Pat. No. 5,348,342. That patent discloses a seat having one or two inflatable air bags. A first bag is provided along the edge of the seat back to provide protection for the torso of the seat occupant. A second air bag is shown near the top of the seat back and inflating upwardly to provide protection for the occupant's head. One concern regarding head side impact air bags is the possible interference between the inflating air bag and the shoulder belt for the seat occupant.

It is an object of the present invention to provide a head side impact air bag for a seat occupant's head which reduces possible interference with a shoulder belt.

Another concern with seat mounted air bags relates to replacement of the bag following bag deployment. A seat mounted air bag deploys through the seat foam and trim cover, causing considerable damage to the seat. The entire seat or the entire seat back may need to be replaced.

It is another object of the invention to minimize the cost of replacing a deployed air bag and repair the seat back.

The seat back of the present invention provides a tower structure extending above from the upper end of the vehicle seat back along one side of the seat. The tower structure contains an inflatable air bag which is deployable from the tower to provide a side head impact air bag to protect the seat occupant. The inflatable air bag is part of a canister which includes the air bag and an inflator within a housing. The canister is attached to the upper end of the seat back frame with the inflatable air bag positioned above the frame. In one embodiment, both the air bag and the inflator are placed above the seat back frame. In another embodiment, the inflator is positioned below the top of the frame and only the air bag is above the frame. This reduces the height of the tower. The positioning of the inflatable air bag above the top of the seat back helps to reduce interference between the air bag, when inflated, and the seat occupant's shoulder belt.

In an alternative seat back design, the shoulder belt is mounted directly to the seat back rather than being mounted to the vehicle body. In this seat, the shoulder belt is coupled to the seat back directly below the inflatable air bag. With this design, interference between the shoulder belt and the inflatable air bag is further reduced for all seat positions because the belt and inflatable air bag remain in constant relative positions regardless of the adjusted position of the seat.

Since the air bag is located along one side of the seat back, a head restraint can be mounted to the seat back adjacent the raised structure for the air bag. Since the head restraint and air bag are separately mounted to the seat back, the head restraint can be fully adjustable vertically and rotationally.

To facilitate replacement of a deployed air bag, the seat back is constructed with a removable side bolster along the one side of the seat back containing the air bag. With the bolster removed, a portion of the seat back frame is revealed with the air bag canister also revealed. The air bag canister is attached to the seat back frame adjacent a lateral edge of a foam pad which forms the center portion of the seat back. The bolster includes its own frame which is substantially surrounded by a bolster foam pad and then covered with a seat trim cover. The bolster has a recessed cavity therein into which the air bag canister is disposed when the bolster is placed onto the side of the seat back frame. The bolster fits over the air bag canister and includes a path for the air bag to deploy through the bolster. Replacement of the deployed air bag is accomplished by removing the side bolster to gain access to the air bag canister. The air bag canister is removably mounted to the frame for easy replacement. Following replacement of the air bag canister, a new bolster is attached to the side of the seat back having an intact foam pad and trim cover, thereby avoiding the need to entirely replace the seat back or the seat assembly and thus reducing the cost of seat repair following deployment of the air bag.

Further objects, features and advantages of the invention will become apparent from a consideration of the following description and the appended claims when taken in connection with the accompanying drawings.

DETAILED DESCRIPTION OF THE PREFERRED EMBODIMENT

Figures 1, 2:
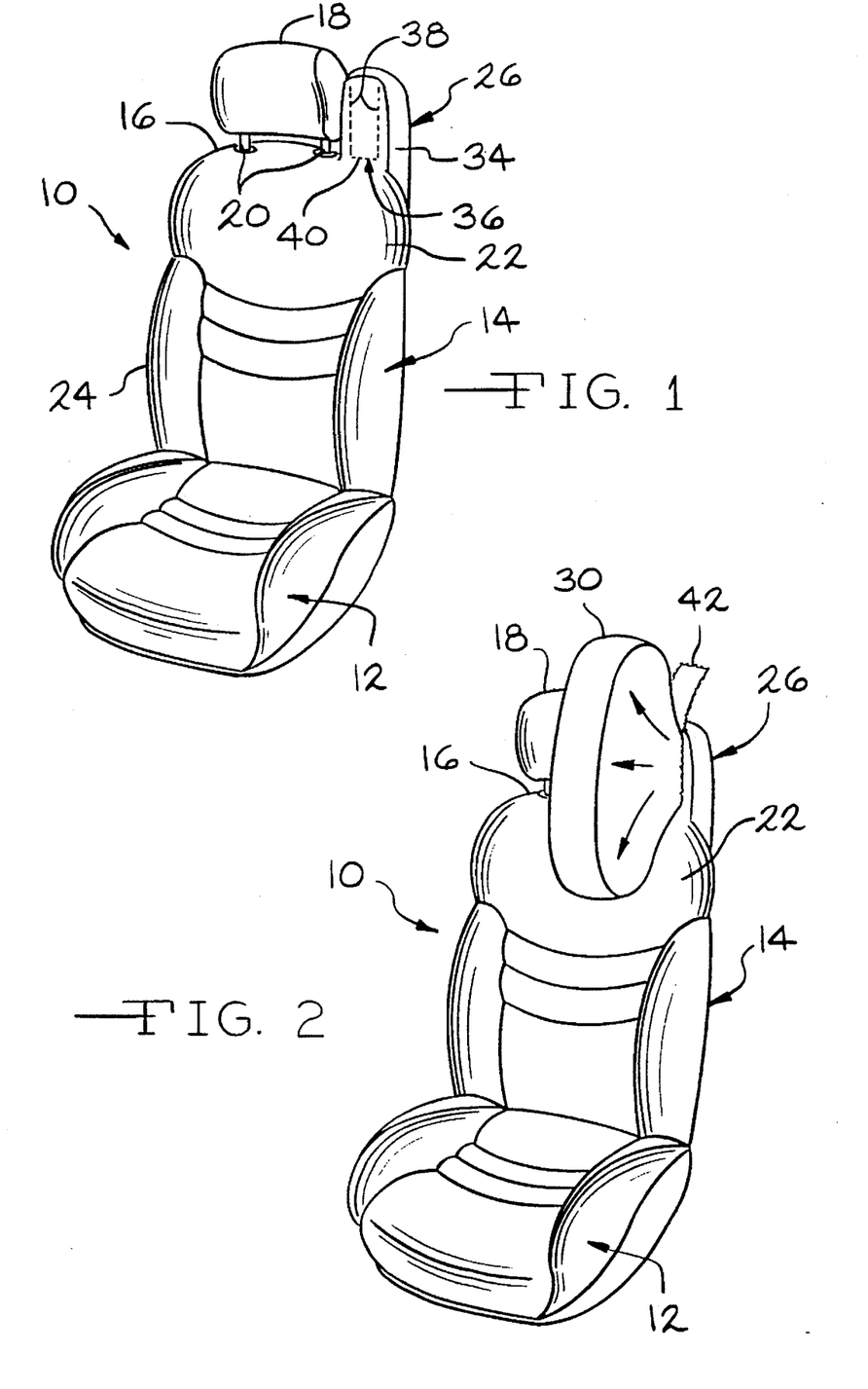
FIG. 1 is a perspective view of the seat assembly of the present invention having an inflatable air bag mounted above the upper end of the seat back.
FIG. 2 is a perspective view of the seat assembly in FIG. 1 illustrating the air bag deployed.

A seat assembly 10 is shown in FIG. 1 having a head side impact air bag above the seat back upper end according to the present invention. The seat assembly 10 includes a lower, generally horizontal, seat cushion 12 and a seat back 14 which extends upwardly from the rear end of the seat cushion 12. The seat back 14 has an upper end 16 with a head restraint 18 extending upwardly therefrom. The head restraint 18 is supported by a pair of posts 20 for vertical adjustment of the head restraint position. The seat back 14 is sized so that its upper end 16 is generally near the shoulder area of an adult seat occupant with the head restraint 18 extending upwardly therefrom to be rearward of the seat occupant's head.

Figures 3, 4:
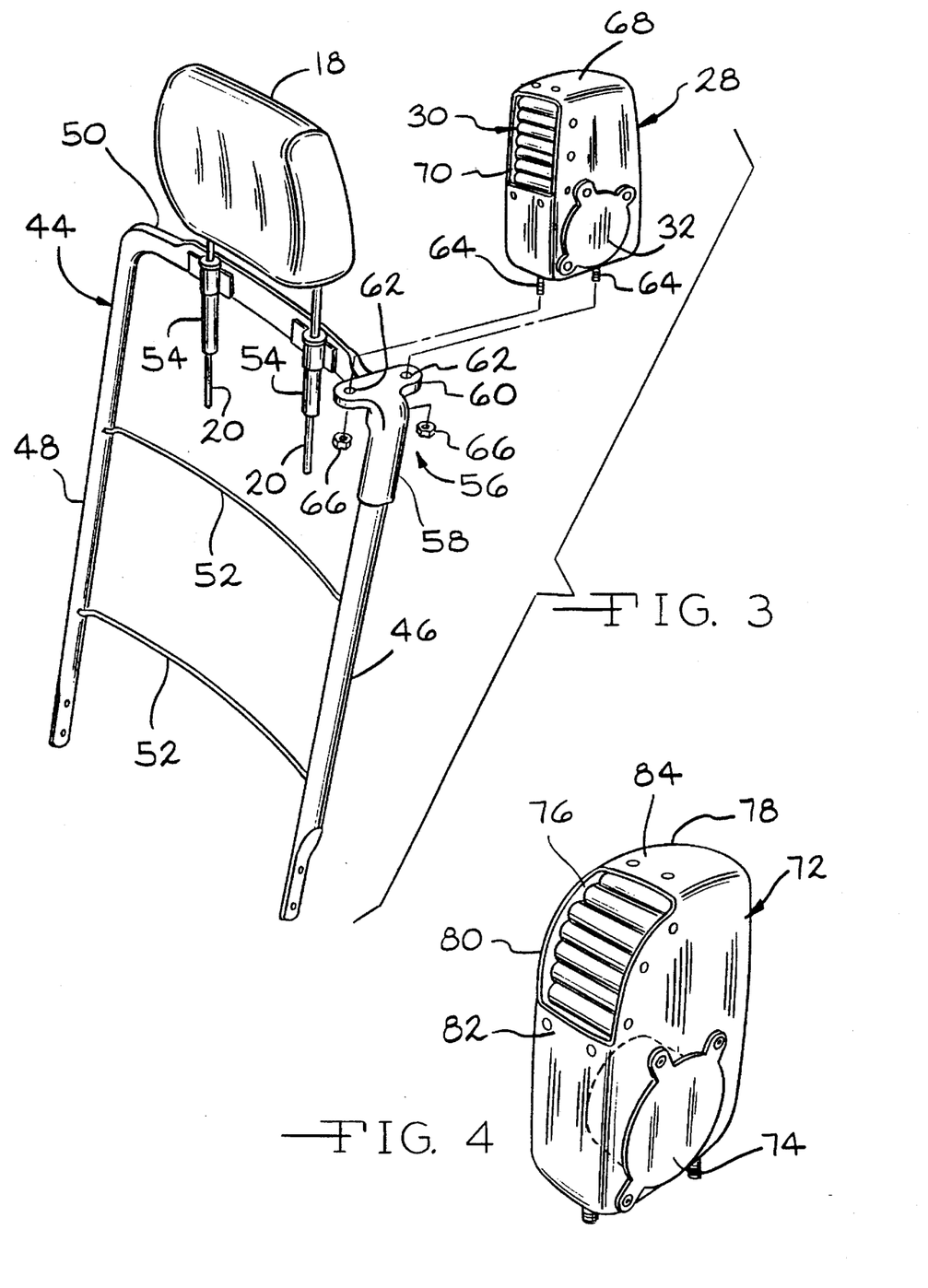
FIG. 3 is a perspective view of the seat back frame illustrating the mounting of the air bag canister to the frame.
FIG. 4 is a perspective view of an alternative embodiment of the air bag canister in which the air bag is deployed in a forward and upward direction from the canister.

The seat back 14 has opposite lateral sides, a left lateral side 22 and a right lateral side 24. The head restraint 18 is positioned generally centrally in the seat back and is not as wide as the seat back so that it does not extend fully to the lateral sides 22, 24. Adjacent the head restraint, along the lateral side 22, a tower 26 extends upwardly from the upper end 16 of the seat back. The tower 26 contains an air bag canister 28 (FIG. 3). The canister 28 includes an inflatable air bag 30 and an inflator 32 to produce an inflation gas to inflate the bag 30.

The tower 26, like the rest of the seat assembly 10, is covered with an upholstery cover 34. On the front of the tower, the upholstery cover includes a top stitch 36 sewn in a generally U-shaped pattern, having spaced vertical portions 38 and a horizontal lower portion 40 connecting the lower ends of the two vertical portions 38. The top stitch 36 forms a line of weakening in the upholstery cover to facilitate tearing of the cover to allow deployment of the inflatable air bag 30. The weakening effect of the top stitch depends on the material used for the upholstery cover.

With reference to FIG. 2, the air bag 30 is shown inflated and extending forward from the tower 26. The bag 30 deploys adjacent to the head of a seat occupant to provide side impact protection for the occupant's head. During deployment, the upholstery cover 34 will tear along the weakened line formed by the top stitch 36. The U-shaped top stitch 36 forms a flap 42 of the upholstery material which will flip upwardly and rearwardly during deployment, and thus move out of the way of the deploying air bag and away from the seat occupant.

With reference to FIG. 3, the frame 44 of the seat back is shown. The frame 44 is a tubular frame bent to form a generally inverted U-shaped structure having a pair of upright legs 46, 48 and an upper cross bar 50. The upper cross bar 50 is located near the seat back upper end 16. Support wires 52 extend laterally across the seat, between the upright legs 46, 48, to support the seat back foam and upholstery (not shown). While the seat back frame 44, as illustrated, is a tubular frame, a variety of different seat back frame structures can be used with the present invention.

A pair of mounting sleeves 54 are attached to the upper cross bar 50 of the seat frame and receive the posts 20 of the head restraint 18 to attach the head restraint to the seat back frame. The sleeves 54 allow for vertical movement of the posts 20 therein to adjust the vertical position of the head restraint 18. Such sleeves are commonly used to mount an automotive seat head restraint.

At the upper corner 56 of the frame where the upright leg 46 joins the upper cross bar 50, a bracket 58 is attached to the frame. The bracket 58 has an upper mounting flange 60 with a pair of apertures 62. The apertures 62 receive studs 64 extending downwardly from the air bag canister 28. Nuts 66 are threaded onto the studs on the lower side of the flange 60 to attach the canister 28 to the bracket 58, and thus, to the frame 44. The bracket 58 can be attached to the frame in any of a variety of ways, i.e., welding, rivets, bolts, etc. Depending upon the structure of the seat back frame, the mounting flange 60 may be integrally formed with the seat back frame as opposed to being part of an add-on mounting bracket as shown in FIG. 3.

The air bag canister 28 includes a housing 68 from which the mounting studs 64 extend. The housing contains the inflator 32 as well as the folded air bag 30. The housing 68 has an opening 70 in the front face of the housing through which the air bag is deployed in a forward direction.

An alternative embodiment of the air bag canister is shown in FIG. 4 and designated generally as canister 72. The canister 72 includes an inflator 74 and a folded air bag 76. The housing 78 of the canister 72 has an opening 80 which is partially contained in the front face 82 of the housing and partially contained in the top 84 of the housing. The air bag 76 will deploy forward and upward from the housing.

Figure 5:
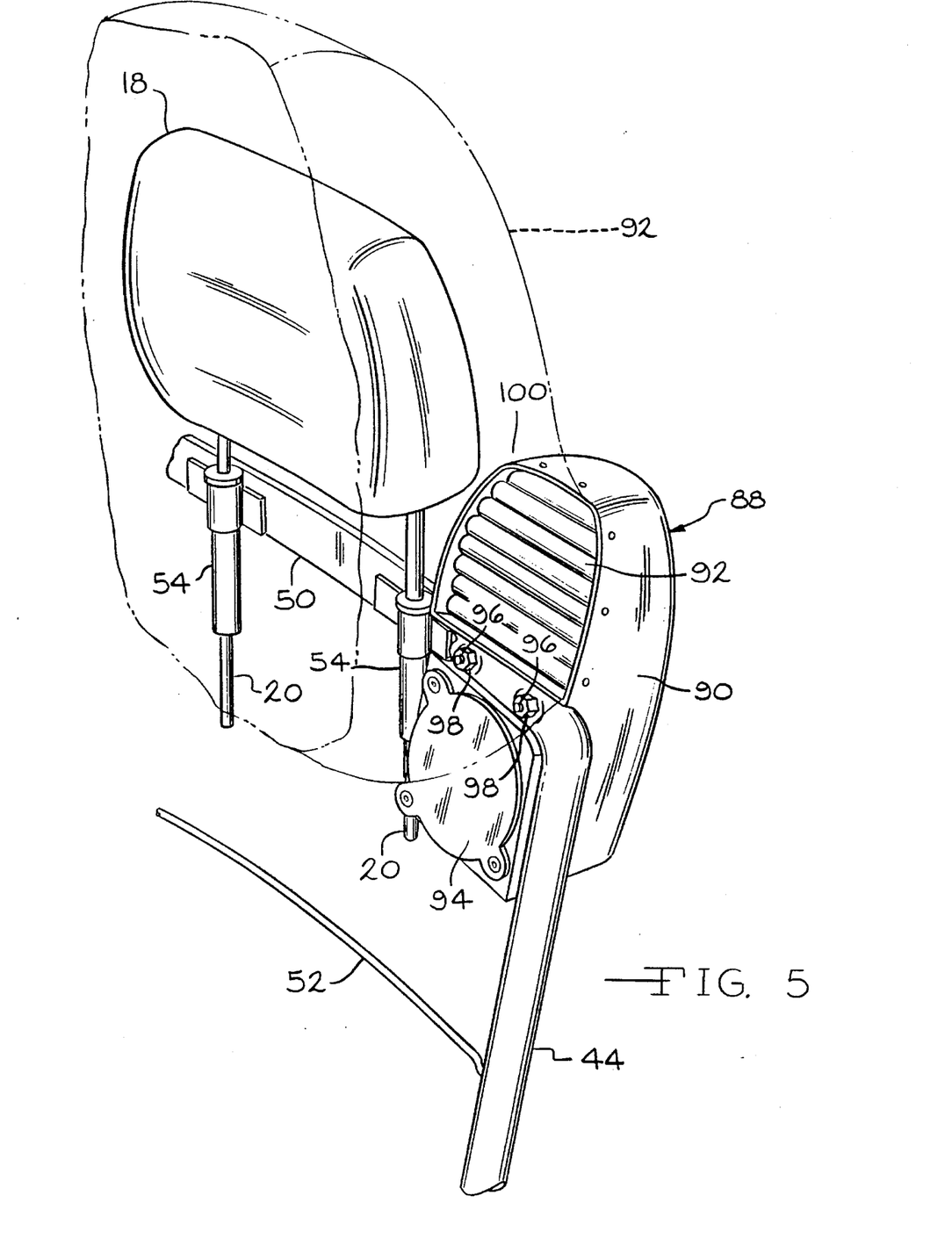
FIG. 5 is a fragmentary perspective view of an alternative embodiment in which the air bag canister mounts the inflator below the upper end of the seat back frame.
Figure 5A:
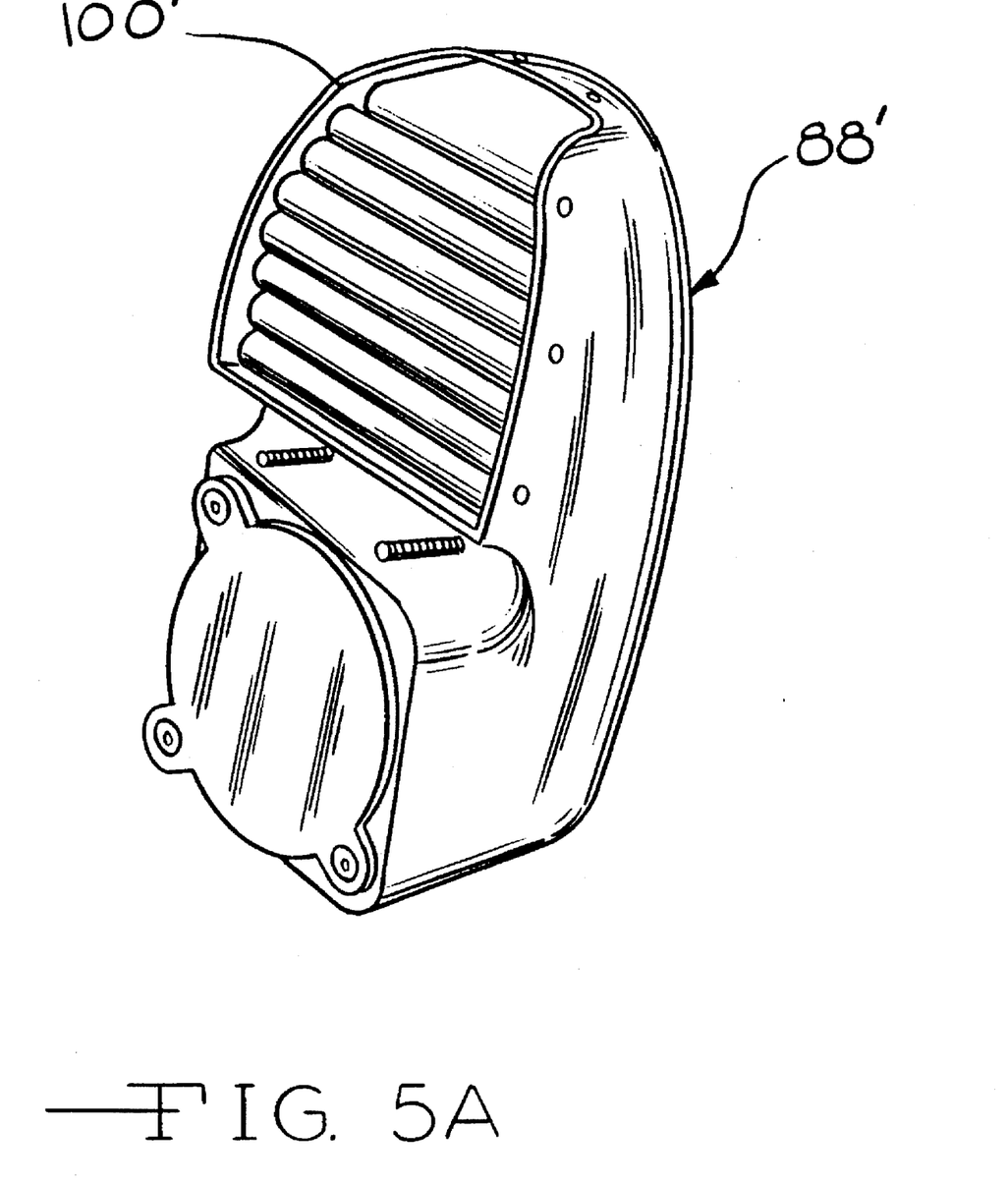
FIG. 5A is a perspective view of a modified form of the air bag canister shown in FIG. 5 in which the air bag deploys in an upward and forward direction.

With reference to FIG. 5, yet another alternative embodiment of the present invention is shown. An air bag canister 88, having a housing 90, is shown attached to the upper cross bar 50 of the seat back frame 44. The canister 88 differs from the previous canisters 28, 72 in that the air bag 92 is folded and stowed in the housing above the cross bar 50 while the inflator 94 is mounted below the cross bar 50. Threaded studs 96 extend forwardly from the housing 90, between the air bag and inflator, and project through the cross bar 50 where they are attached by nuts 98. The opening 100 in the housing 90 is disposed in the front face of the housing. A modified form of the canister 88 is shown in FIG. 5A and designated as 88'. The canister 88' has an opening 100' which is disposed in both the front face and the top of the housing.

By using the canister 88, with the inflator located below the cross bar 50, a tower structure is lower in height than the tower 26 shown in FIG. 1. A benefit of the lower tower structure is increased visibility for a seat occupant. Also, the lower tower can facilitate assembly of the vehicle since the overall height of the seat is less. This makes it easier to pass the seat assembly through the vehicle door and into the passenger compartment of the vehicle. With both of the canisters 72, 88, having a forward and upward deployment of the air bag, the vertical portions of the top stitch in the cover will extend onto the top of the tower.

Figure 6:
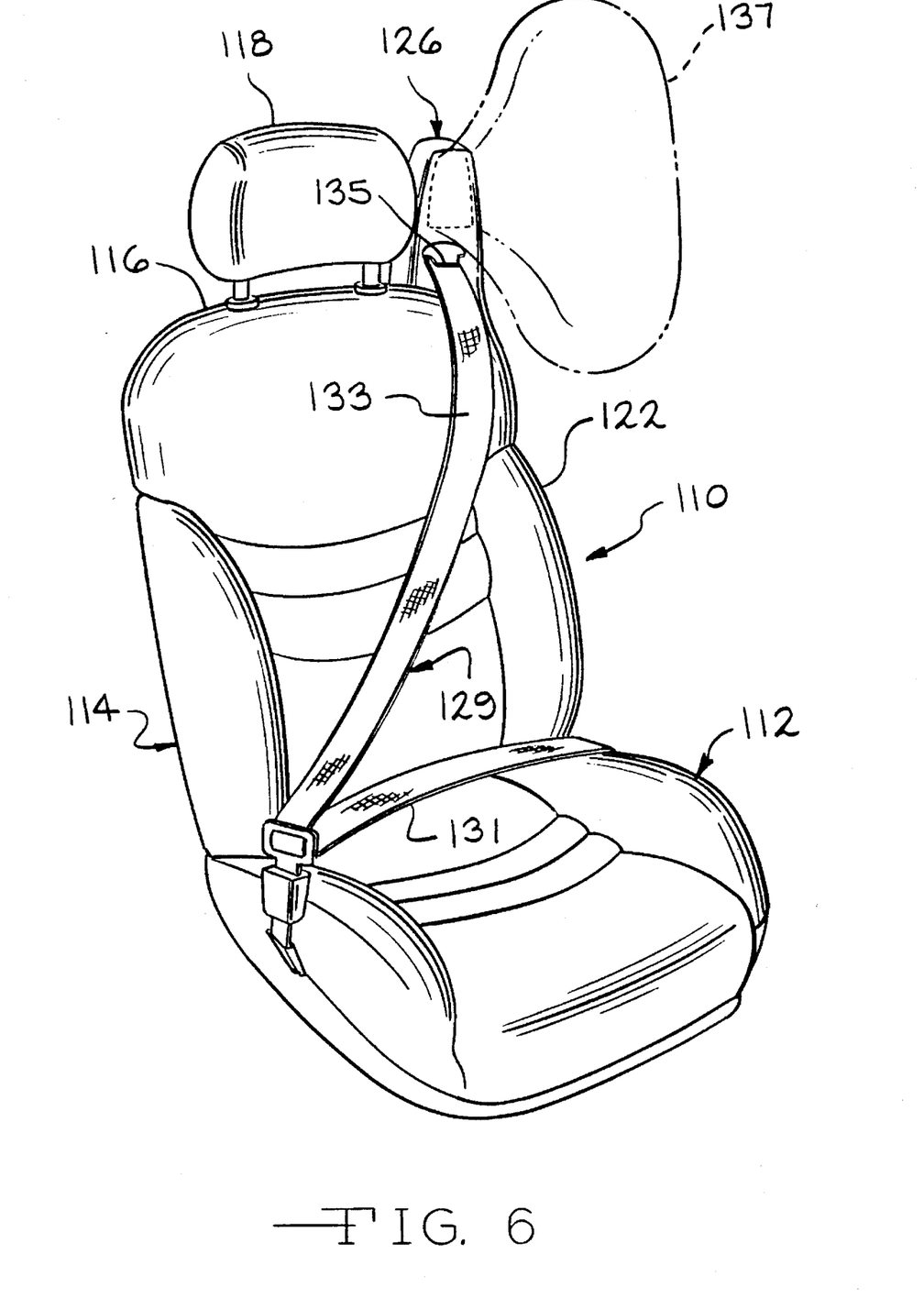
FIG. 6 is a perspective view of an integrated seat having a seat belt and shoulder belt mounted to the seat assembly with the air bag positioned above the seat back and shoulder belt.

Another alternative embodiment of the invention is shown in FIG. 6 in connection with a seat assembly 110. The seat assembly 110 has a lower seat cushion 112 and a generally upright seat back 114 which extends upwardly at the rear of the seat cushion 112. A head restraint 118 extends upward from the upper end 116 of the seat back. Along the left lateral side 122 of the seat back, a tower 126 extends upwardly above the seat back upper end 116.

The tower 126 contains an air bag 137. The air bag 137 is part of an air bag canister mounted to the seat back frame and extending upwardly from the seat back upper end 116. The seat assembly 110 differs from seat assembly 10 in that a passenger restraining belt 129 is part of the seat assembly 110 and is mounted directly to the seat back and seat cushion. The belt 129 is used to form a lap belt 131 extending over the lap of a seat occupant and a shoulder belt 133 extending diagonally across the torso of a seat occupant. At its upper end 135, the shoulder belt 133 extends into the seat back vertically below the air bag 137. The shoulder belt will typically extend into the seat back immediately below the air bag or the air bag canister. The shoulder belt may extend into the tower, as shown in FIG. 6, or it may extend into the seat back below the tower. By mounting both the shoulder belt and the inflatable air bag to the seat back, the relative positions of the shoulder belt and air bag will remain constant, regardless of the adjusted position of the seat back within the motor vehicle. This reduces possible interference between the air bag and shoulder belt.

The seat back of the present invention, by mounting a head side impact air bag to the seat back in a tower above the seat back, but separate from the head restraint, provides a seat back having a fully adjustable head restraint and provides head side impact protection. By mounting the air bag above the seat back upper end, interference between the air bag and the seat shoulder belt can be reduced.

Figure 8:
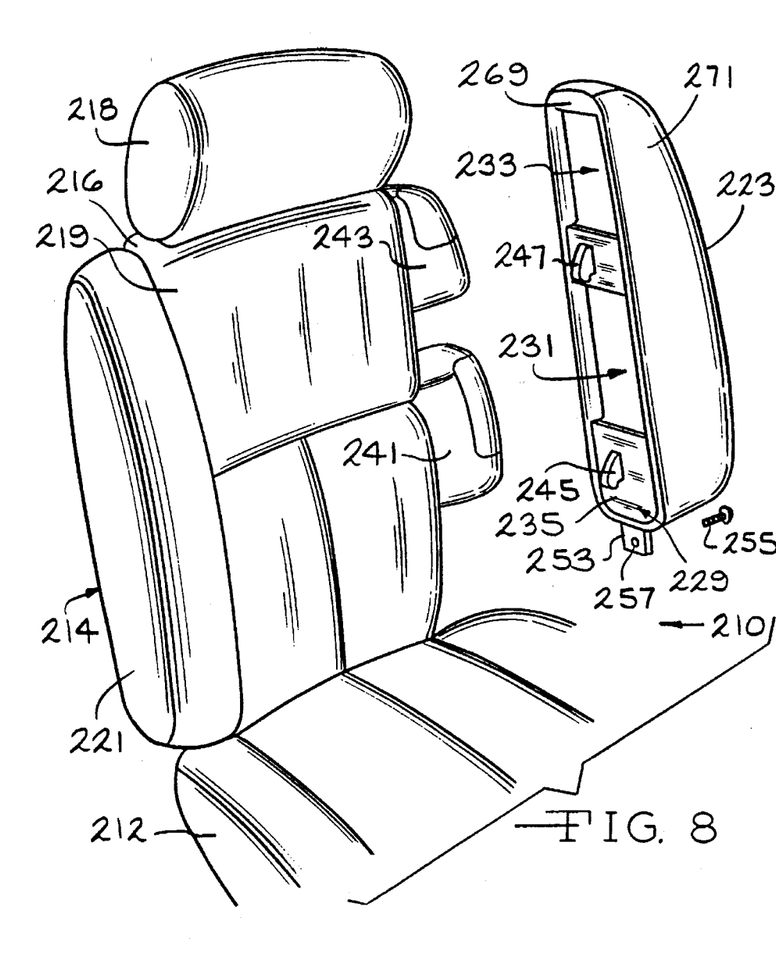
FIG. 8 is a exploded perspective view illustrating the side bolster removed revealing the two air bag canisters.
Figure 9:
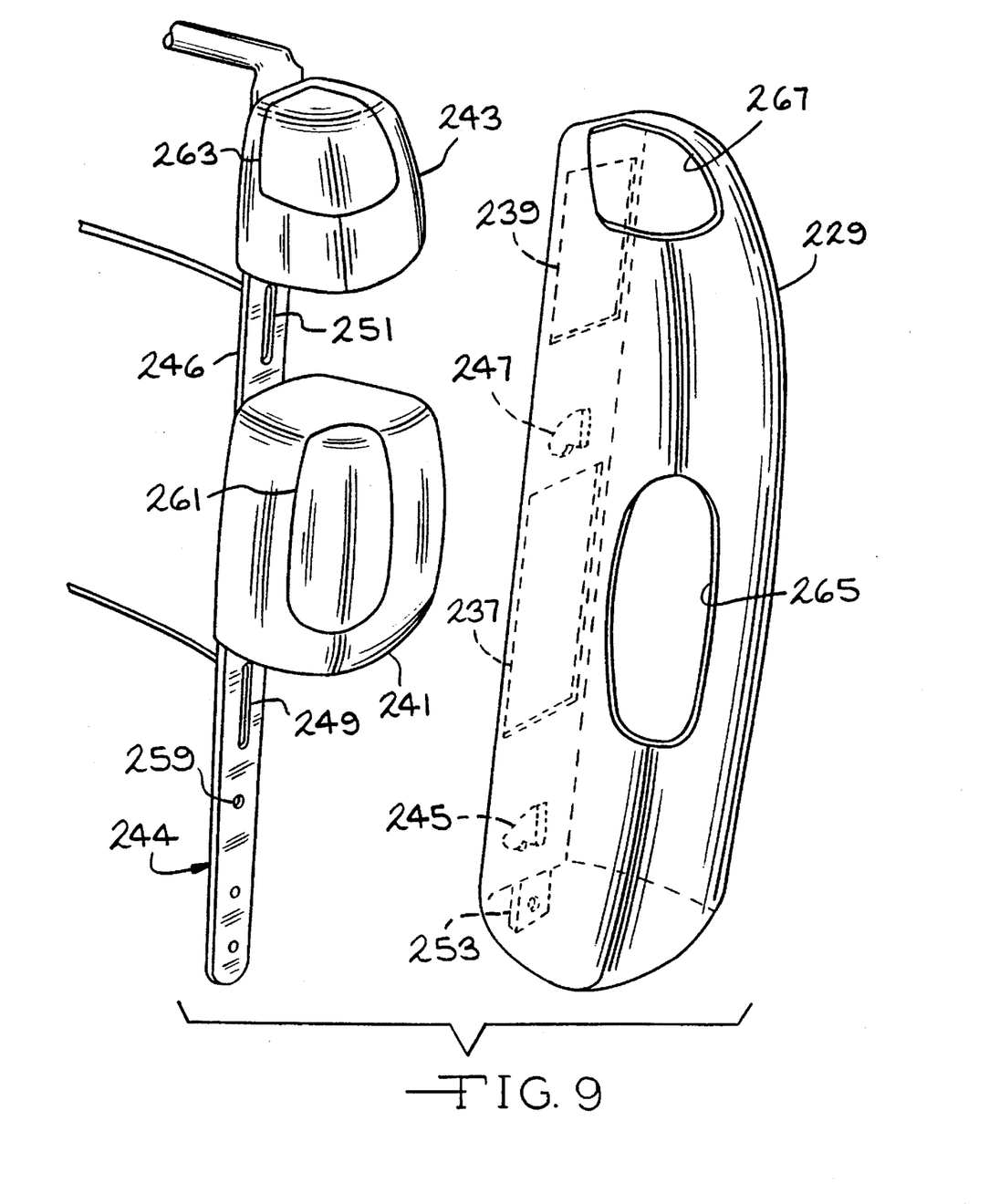
FIG. 9 is a fragmentary perspective view illustrating the air bag canisters mounted to the seat back frame and the bolster frame removed from the seat back frame.

A seat back having the removable side bolster of the present invention is shown in FIG. 8 and labeled generally as 210. The seat assembly 210 includes a seat cushion 212 and a seat back 214. Extending upwardly from the upper end 216 of the seat back is a head restraint 218. The seat back 214 includes a seat back frame 244 (FIG. 9). The seat back frame 244 supports a central foam pad 219 and a pair of side bolsters, a right side bolster 221 and a left side bolster 223.

Figure 7:
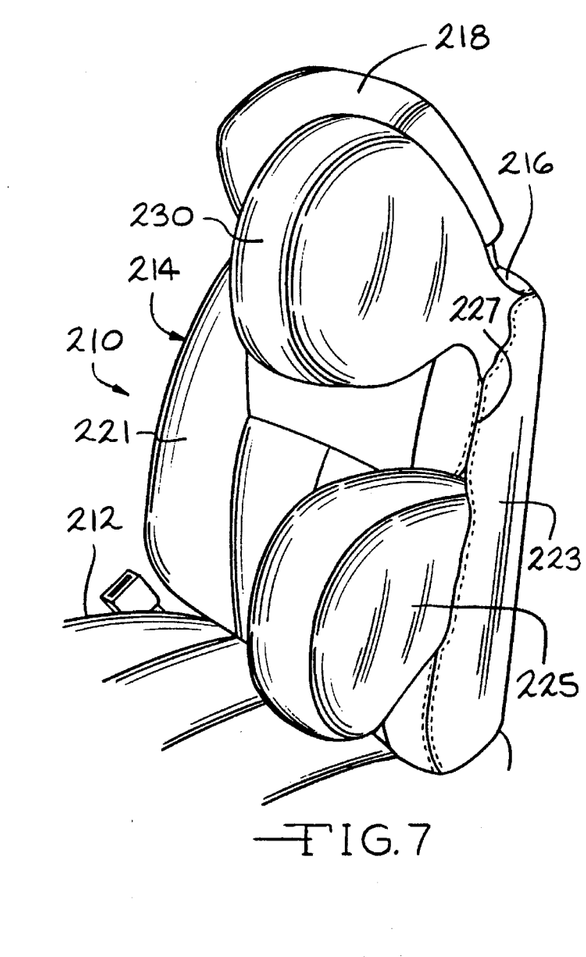
FIG. 7 is a perspective view of the seat back having a pair of deployed side impact air bags and with a removable side bolster.

As shown in FIG. 7, the seat assembly has a pair of side impact air bags, a lower air bag 225 and an upper head side impact air bag 230. When inflated, the air bags 225, 230 tear through a seam 227 in the left side bolster 223.

As seen in FIG. 8, the left side bolster 223 is removable from the seat back. The bolster 223 includes a bolster frame or armature 229 (FIG. 9). The bolster frame 229 is shown in a preferred embodiment as being a hollow body 234 having a pair of recessed cavities 231, 233 along the inner face 235 of the bolster which engages the foam pad 219 of the seat back. The recess cavities 231, 233 are accessed by openings 237, 239 in the bolster inner face 235.

Attached to the upright side leg 246 of the seat back frame 244 are a pair of air bag canisters 241, 243. The air bag canister 241 contains the folded air bag 225 while the air bag canister 243 contains the folded air bag 230. In addition, each of the canisters contains an inflator for producing an inflation gas to inflate the respective air bags. The bolster 223 is placed over the air bag canisters with the canisters being inserted through the openings 237, 239 to dispose the canisters within the hollow interior of the bolster frame 229.

Extending from the inner face 235 of the bolster frame are a pair of hooks 245, 247. The hooks are open downwardly and are inserted into vertical slots 249, 251 formed in the upright leg 246 of the seat back frame. The bolster is attached to the frame by inserting the hooks into the slots and then moving the entire bolster downward. In addition, a tab 253 extends downwardly from the hollow body 234 of the bolster frame 229. A threaded fastener such as a screw or bolt 255 is inserted through an aperture 257 and the tab 253 and into an aperture 259 in the upright leg 246 of the seat back frame. Once the tab 253 is fastened to the seat back frame, the bolster is prevented from upward movement necessary to remove the hooks 245, 247 from the slots of the seat back frame.

The two air bag canisters 241, 243 include openings 261, 263 for deployment of the air bags from the canisters. These openings are aligned with openings 265, 267 in the hollow body of the bolster frame 229. The openings 265, 267 in the bolster frame provide a passage for the air bags to deploy through. The bolster frame 229 is covered with a second foam pad 269 which is in turn covered with a trim cover 271 which contains the seam 227 previously mentioned.

Figure 10:
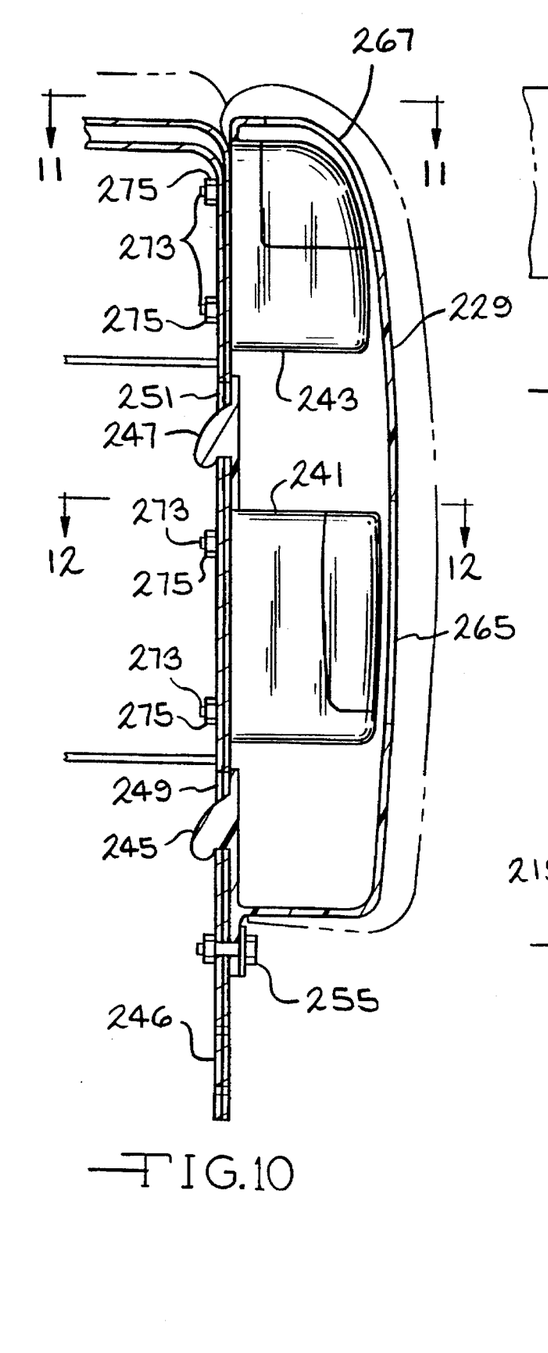
FIG. 10 is a front sectional view illustrating the seat back frame, bolster frame and air bag canisters.
Figure 11:
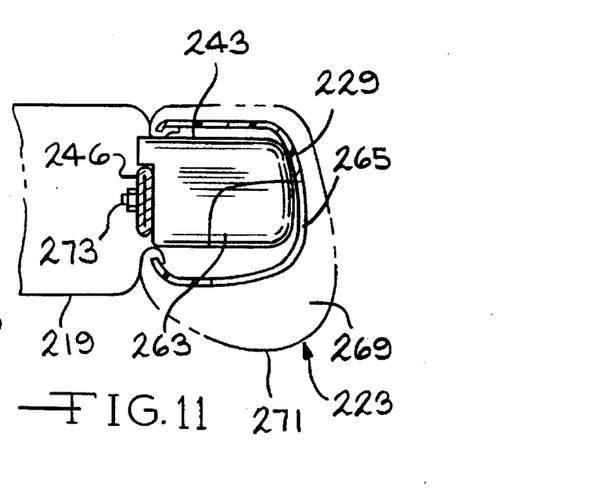
FIG. 11 is a sectional view as seen from substantially the line 11—11 of FIG. 10.
Figure 12:
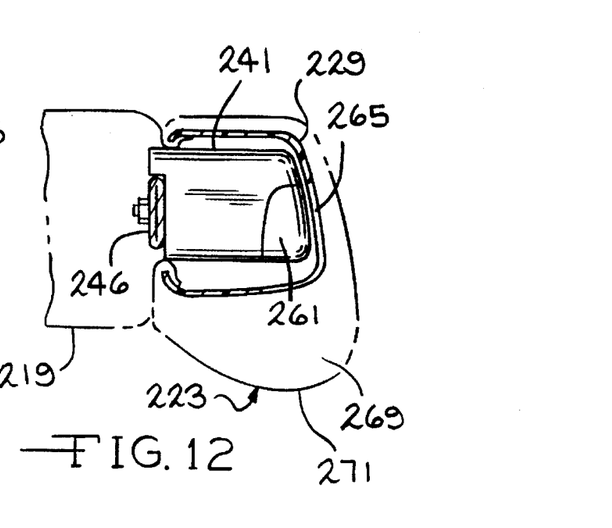
FIG. 12 is a sectional view as seen from substantially the line 12—12 of FIG. 10.

With reference to FIG. 10, the bolster 223 is shown attached to the upright leg 246 of the seat back frame. The bolster frame 229 is shown with its hooks 245, 247 inserted into the slots 249, 251 to hang the bolster frame on the seat back frame.

The air bag canisters 241, 243 are attached to the seat back frame by threaded studs 273 and nuts 275.

After deployment of the air bags through the bolster foam and trim cover, the bolster is removed from the seat back frame by removing the bolt 255 and lifting the bolster from the slots in the seat back frame. New air bag canisters attached to the seat back frame and a new bolster is placed over the air bag canisters and attached to the seat back frame. As a result, the air bag canisters are replaced and the bolster replaced instead of replacing the entire seat back or the entire seat assembly at a much greater cost.

Figure 13:
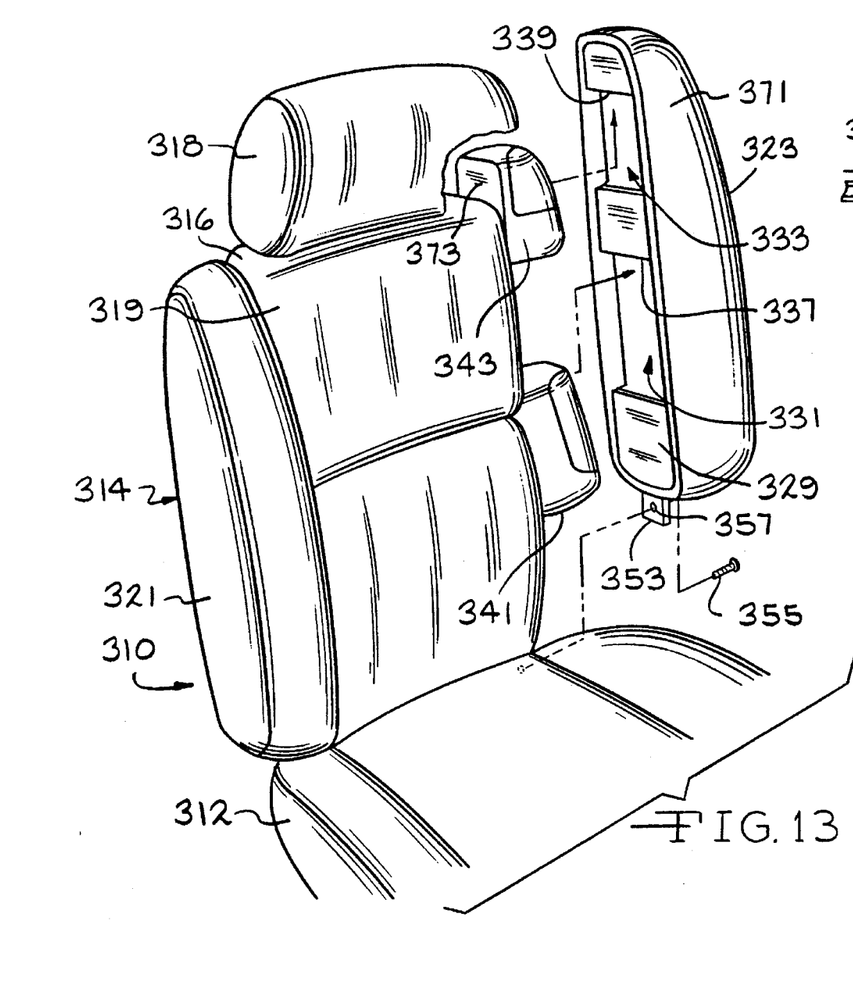
FIG. 13 is a perspective view similar to FIG. 8 illustrating an alternative embodiment for attachment of the bolster to the seat back frame.
Figure 14:
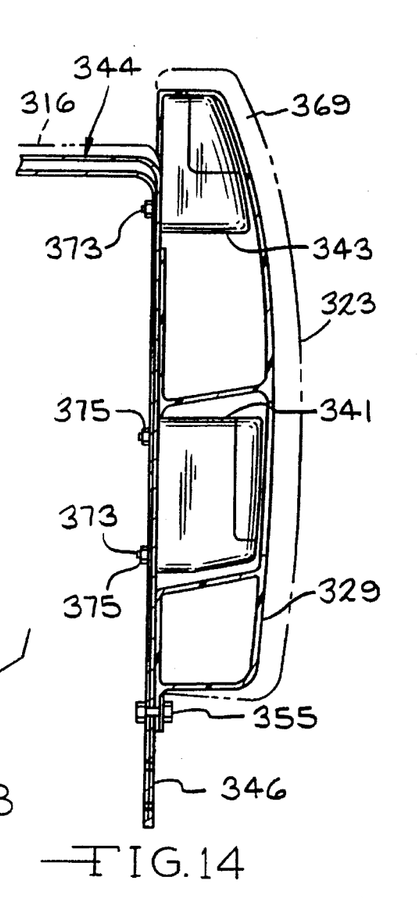
FIG. 14 is a front sectional view illustrating the embodiment of FIG. 13.

Another embodiment of the replaceable side bolster is shown in FIGS. 13 and 14 in connection with an air bag canister which is mounted to the seat back frame with the air bag above the upper end of the seat back providing the structure described previously. The seat assembly 310 includes a seat cushion 312 and a seat back 314. Extending upwardly from the upper end 316 of the seat back is a head restraint 318. The seat back includes a seat back frame 344 which supports a center foam pad 319 and a pair of side bolsters, a right side bolster 321 and a left side bolster 323. The left side bolster 323 is removable from the upright leg 346 of the seat back frame and covers a pair of air bag canisters 341, 343. The air bag canister 343 is mounted to the seat back frame such that the folded air bag is exposed generally above the upper end 316 of the seat back.

The left side bolster is removably mounted to the seat back frame to enable replacement of the bolster and the air bag canisters following deployment of the air bags. The bolster frame 329, instead of having hooks which are inserted into slots in the frame, is fitted down over the top of the upper air bag canister 343, such that the canister itself provides attachment of the bolster frame to the seat back at the seat upper end. The bolster is mounted to the seat back by first placing the bolster over the air bag canister 343 by inserting the canister into the opening 339 in the bolster. The bolster is then slid downward over the canister so that the bolster covers the inner board surface 373 of the canister. The bolster is then rotated downward over the canister 341, then inserting the canister through the opening 337 into the bolster. The bolt 355 then attaches the tab 353 to the seat back frame, preventing removal of the bolster off the canisters.

The seat back of the present invention provides an air bag canister which is positioned above the upper end of the seat back to reduce interference between the air bag and the shoulder belt. In addition, the canister is easily replaced by removal and replacement of a small portion of the seat assembly, namely the side bolster. This avoids the need for costly replacement of the seat back or the entire seat assembly.

It is to be understood that the invention is not limited to the exact construction illustrated and described above, but that various changes and modifications may be made without departing from the spirit and scope of the invention as defined in the following claims.

We claim:

1. A vehicle seat assembly comprising:

a generally horizontal seat cushion having a rear end;

a seat back extending upwardly at said rear end of said seat cushion, said seat back having opposite lateral sides and an upper end;

a tower extending above said seat back upper end adjacent one lateral side of said seat back; and an inflatable air bag stowed above said seat back upper end within said tower, said air bag being inflatable to a deployed position extending forward from said tower to provide an air bag above the upper end of said seat back along said one lateral side adjacent the head of a seat assembly occupant.

2. The seat assembly of claim 1 further comprising a head restraint mounted to said seat back and extending upward above said upper end of said seat back adjacent to said tower.

3. The seat assembly of claim 2 wherein said head restraint is separate from said tower and further comprising means for adjusting the vertical position of said head restraint relative to said seat back upper end whereby said head restraint is vertically adjustable without affecting the position of said air bag.

4. The seat assembly of claim 1 further comprising an inflator within said tower for generating a gas to inflate said air bag.

5. A vehicle seat assembly comprising:

a generally horizontal seat cushion having a rear end;

a seat back extending upwardly at said rear end of said seat cushion, said seat back having opposite lateral sides and an upper end;

a head restraint mounted to said seat back and positioned above said upper end of said seat back;

means for adjusting the vertical position of said head restraint relative to said seat back upper end;

a tower extending above said seat back upper end adjacent one lateral side of said seat back and alongside said head restraint;

an inflatable air bag mounted above said seat back upper end within said tower, said air bag being inflatable to a deployed position above the upper end of said seat back along said one lateral side adjacent the head of a seat assembly occupant; and a shoulder belt for restraining a seat occupant, said shoulder belt projecting from said seat back at a location vertically below said air bag and extending downwardly therefrom.

6. The vehicle seat assembly of claim 5 wherein said shoulder belt projects from said tower beneath said air bag and above said seat back upper end.

* * * * *